(12) United States Patent
Krueger

(10) Patent No.: US 7,344,013 B2
(45) Date of Patent: Mar. 18, 2008

(54) LOADING SUPPORT DEVICE FOR CARGO SPACES IN A MEANS OF TRANSPORT, IN PARTICULAR FOR CARGO SPACES IN AIRCRAFTS

(75) Inventor: Jens Krueger, Schoenebeck (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/279,430

(22) Filed: Apr. 12, 2006

(65) Prior Publication Data
US 2006/0243861 A1 Nov. 2, 2006

(30) Foreign Application Priority Data
Apr. 15, 2005 (DE) ............... 10 2005 017 425

(51) Int. Cl.
*B65G 13/00* (2006.01)
(52) U.S. Cl. ............. 193/35 R; 244/118.1; 414/533
(58) Field of Classification Search ............. 193/35 R, 193/35 SS; 198/860.1; 244/118.1, 118.2; 414/529, 532, 533, 536
See application file for complete search history.

(56) References Cited
U.S. PATENT DOCUMENTS 3,720,329 A * 3/1973 Gamble .................. 414/533
3,763,980 A * 10/1973 Stein et al. ............... 193/35 R
4,395,172 A * 7/1983 Hoener et al. ........... 244/118.1
5,927,650 A * 7/1999 Huber ..................... 244/118.1
7,007,786 B2 3/2006 Huber et al.
2004/0247422 A1* 12/2004 Neumann et al. ......... 193/35 R

FOREIGN PATENT DOCUMENTS

DE 10319504 A1 11/2004
EP 0 315 236 5/1989
EP 1473224 11/2004

* cited by examiner

Primary Examiner—James R. Bidwell
(74) Attorney, Agent, or Firm—Christopher Parodies; Fowler White Boggs Banker P.A.

(57) ABSTRACT

A loading device for cargo spaces in transportation means, in particular for cargo spaces in aircraft, includes a roller conveyor that contacts a substructure in a first position for placing cargo units in the cargo space. In one embodiment, the roller conveyor has contact surfaces on both sides and the substructure 3 is formed as a U-profile having a base and two webs. Both webs of the U-profile have bearing surfaces oriented at least partially inwardly and the contact surfaces are formed, such that they cooperate with the bearing surfaces in the first position and in a second position. In the second position, the roller conveyer 2 is insertable into the substructure for forming a substantially flat base surface of the cargo chamber, which serves in particular for placing vehicles into a cargo space.

20 Claims, 4 Drawing Sheets

LOADING SUPPORT DEVICE FOR CARGO SPACES IN A MEANS OF TRANSPORT, IN PARTICULAR FOR CARGO SPACES IN AIRCRAFTS

FIELD OF THE INVENTION

The field relates to a loading device for cargo spaces in transportation means, in particular for cargo spaces in aircraft, with a roller conveyor bearing in a first position on a substructure for transferring cargo units into the cargo space and in a second position in the substructure for transferring vehicles into the cargo space.

BACKGROUND

A number of types of loading devices for cargo spaces in transportation means are known, in particular for cargo spaces in aircraft. EP 0 315 236 A1 relates to a motorized roller conveyor for energy-saving loading of a cargo chamber with standardized cargo units, such as air cargo containers, pallets, or the like for example. A supporting application during loading with self-driving vehicles is not provided. In addition, the motorized roller conveyor disclosed in EP 0 315 236 A1 has a technically very expensive construction.

SUMMARY OF THE INVENTION

One object of is to provide a loading device for cargo spaces, in particular for cargo spaces of aircraft, which makes possible a constructively simple structure with weight-savings compared with known loading devices, as well as loading of the cargo space with standardized cargo units as well as loading of the cargo space with vehicles.

In one example, the roller conveyor has contact surfaces on both sides and the substructure is formed as a U-profile, whereby both webs of the U-profile have bearing surfaces at least partially directed inwardly and the contact surfaces are formed, such that they cooperate with the bearing surfaces in the first position and in a second position. In the second position, the roller conveyor is insertable into the substructure for forming substantially flat base surface of the cargo space, which serves in particular for transferring vehicles into the cargo space. Because of these features, one advantage of the loading device is that a particularly effective force transfer of the pressure forces from the roller conveyor as a result of loads on it into the substructure and therefore, into the base surface of the cargo chamber, is provided. For example, effective conductance of pressing forces onto the substructure 3 may be provided because of the cooperation of contact surfaces 34-37 of the roller conveyor 2 with the bearing surfaces 25,26 of the substructure. As a result, pressing forces are transferred substantially along edges over an entire length of the loading device. In addition, forces acting on the roller conveyor 2 in the longitudinal direction or in the x direction also can be transferred well. By eliminating additional contact means for supporting the roller conveyor in the substructure, in addition, another advantage of the loading device is that the weight of the roller conveyor can be reduced and the constructive structure can be simplified. A still another advantage is that, complex, large surface, flexibly changeable and relatively lightweight loading and unloading systems can be built in cargo spaces of transportation means, in particular cargo spaces of aircraft, by a combination or series of a plurality of loading devices. Another advantage is that the roller conveyor may be mechanically easier to assemble. Yet another advantage is that the roller conveyor 2 may be locked by manually activable locking means 12, 13 onto the substructure and is capable of being removed from the substructure.

The loading device therefore can be converted quickly from a first position ("roller conveyor mode"), which serves in particular for loading the cargo space with standardized cargo units, for example, with containers or pallets, by rotating along the longitudinal axis of the loading device into into a second position ("flat mode"), which serves especially for loading a cargo space with vehicles. This may be important with large-surface cargo spaces, in which a large number of loading devices is installed. The conversion therefore takes place in a simple way and manner by rotating or inverting, so that also untrained personnel can be used for cargo space conversion. The conversion takes place additionally alone manually without requiring specialized tools. The locking state of the loading device can be checked by personnel at a glance. Finally, the loading device has no parts that can be lost.

According to a further advantageous embodiment of the loading device a holding device is provided in the area of a base of the U-profile. The holding device makes possible a locking of the roller conveyor into the substructure in the "roller conveyor mode" as well as in the "flat mode".

According to the specifications of a further, advantageous embodiment, the holding device has at least two supports, which can be inserted into corresponding recesses in the roller conveyor. This embodiment makes possible an effective conducting of the forces occurring in the longitudinal direction of the roller conveyor into the substructure and therewith, into the base surface of the cargo space.

According to a further advantageous embodiment, the supports are arranged, such that the transport rollers of the roller conveyor are located in the second position between the supports. In this manner, a substantially flush contact between the underside of the rotated roller conveyor and the adjacent floor plates of the base surface of the cargo space is provided, so that as a result, a continuous base surface of the cargo space that is suitable for loading vehicles is provided.

According to a further advantageous embodiment, it is provided that the supports are disposed in the area of a center line of the base. This embodiment makes possible a high degree of symmetry, which permits a uniform force conductance of the forces originating from the roller conveyor into the substructure.

Further advantageous examples of the assembly are apparent from the drawings and detailed description.

DETAILED DESCRIPTION

Figure 1:
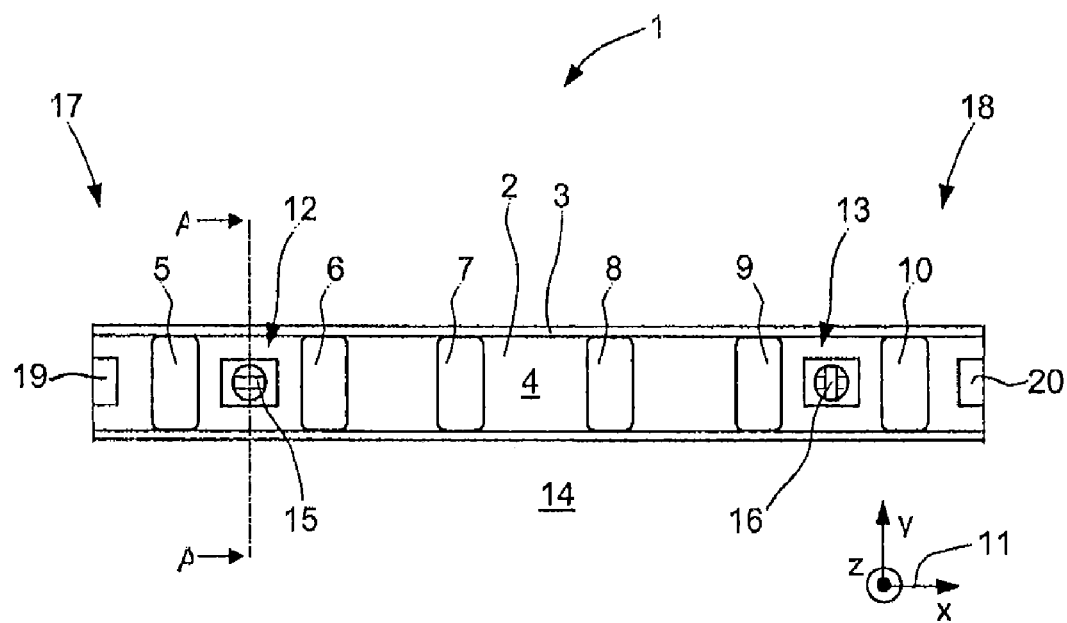
FIG. 1 shows a plan view of a loading device in a first position.

The examples described and drawings rendered are illustrative and are not to be read as limiting the scope of the invention as it is defined by the appended claims. FIG. 1 shows a plan view of a loading device in a first position, which serves in particular for loading cargo units with standardized dimensions, in particular, of palettes and containers, into the cargo space ("roller conveyor mode"). In the drawing, the same constructive elements are designated with the same reference numerals.

A loading device 1 includes among other things a roller conveyor 2 as well as a substructure 3. The roller conveyor 2 has on a top side 4 essentially six transport rollers 5, 6, 7, 8, 9, 10, which preferably are distributed uniformly over a length of the roller conveyor 2. The transport rollers 5, 6, 7, 8, 9, 10 are accommodated to be freely rotatable in the roller conveyor 2 by means of bearings (not shown in detail). The transport rollers 5, 6, 7, 8, 9, 10 are not motorized in the embodiment shown, in order to achieve in a simple manner a relatively lightweight construction. Alternatively, a motorized drive of the transport rollers 5, 6, 7, 8, 9, 10 may be provided. For illustrating the position of the x-, the y-, as well as the z-axes in space, the coordinate system 11 is shown.

The transport rollers 5, 6, 7, 8, 9, 10 of the roller conveyor 2 face upwardly in the illustrated first position, in the direction of the z-axis, in order to make possible an easy and fast positioning of the cargo units, in particular, of containers or palettes with standardized dimensions, for example within a cargo space of an aircraft. In a preferred embodiment of the loading device 1, the roller conveyor 2 as well as the substructure 3 each have a length of one meter to four meters, preferably two meters. A number of transport rollers 5, 6, 7, 8, 9, 10 that deviates from the number in the embodiment shown may depend on the length of the roller conveyor 2 and the substructure 3 and/or the mass of the cargo units to be moved.

The roller conveyor 2 is accommodated in the substructure 3 and can be connected releasably to it preferably by two locking means 12, 13. The roller conveyor 2 is accommodated in the substructure to such an extent that the transport rollers 5, 6, 7, 8, 9, 10 project over a base surface 14 of a cargo space (not shown), in order to make it possible that the cargo units are easily rolled across. The locking means 12, 13 each have a rotatable locking bar 15, 16. Departing from the shown rotatable locking bars 15, 16, also other constructive embodiments of the locking means 12, 13 can be selected. For example, instead of the locking bar 15, 16, also positionable rings, levers or the like can be provided. The locking bar 15 of the locking means 12 in FIG. 1 runs in a straight position parallel to the x-axis, that is, an unlocked position, while the locking bar 16 of the locking means 13 is located in a transverse position, that is, a locked position. The locking bars 15, 16 can have latching means, for example, spring-loaded balls or the like, which cooperate with corresponding recesses, in order to display for a user the unlocked or the locked position of the locking bars 15, 16 by engagement.

In a starting area 17 and an end area 18 of the roller conveyor 2, recesses 19, 20 are inserted, so that a user can lift up the loading device 1 from the base surface 14, for example, in order to rotate the loading device 1 about the longitudinal axis, that is, parallel to the x-axis about 180°, that is, inverting it. This constructive state, then, is of particular importance when the loading device 1, as preferably provided, is secured into the base surface 14 of the cargo space in a generally "seamless" manner.

Figure 2:
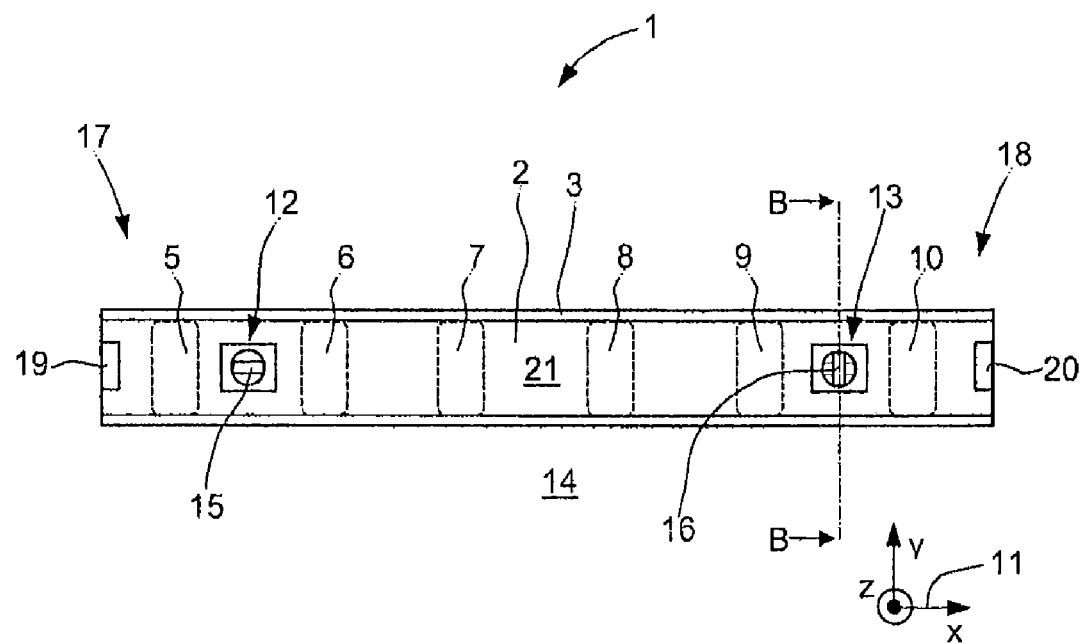
FIG. 2 shows a plan view of the loading device in a second position.

FIG. 2 shows a plan view of a loading device in a second position. This second position serves especially for transferring or driving vehicles into the cargo space ("flat mode"). For visualizing the position of the x-, the y-, as well as the x-axes in space, again a coordinate system 11 is shown.

The roller conveyor 2 also is accommodated in the second position or in the inverted position in the substructure 3 for forming the loading device, whereby in contrast to FIG. 1, a substantially flat underside 21 of the roller conveyor 2 faces upwardly, that is in the direction of the z-axis, so that in this second position of the loading device 1, in particular, vehicles can be brought easily or driven into the cargo space.

The six rotatably mounted transport rollers 5, 6, 7, 8, 9, 10 lie beneath the plane of the drawing and are covered by the roller conveyor 2. The roller conveyor 2 is releasably connected by means of the locking means 12, 13 with the substructure 3. The locking bars 15, 16 contact preferably generally flush with the underside 21 of the roller conveyor 2, so that the locking bars 15, 16 form a continuous and flat loading surface of the cargo space with the base surface 14. The locking bar 15 is shown in the unlocked position, while the locking bar 16 is positioned in the locked position. The recesses 19, 20 are located in the starting area 17 and the ending area 18.

Figure 3:
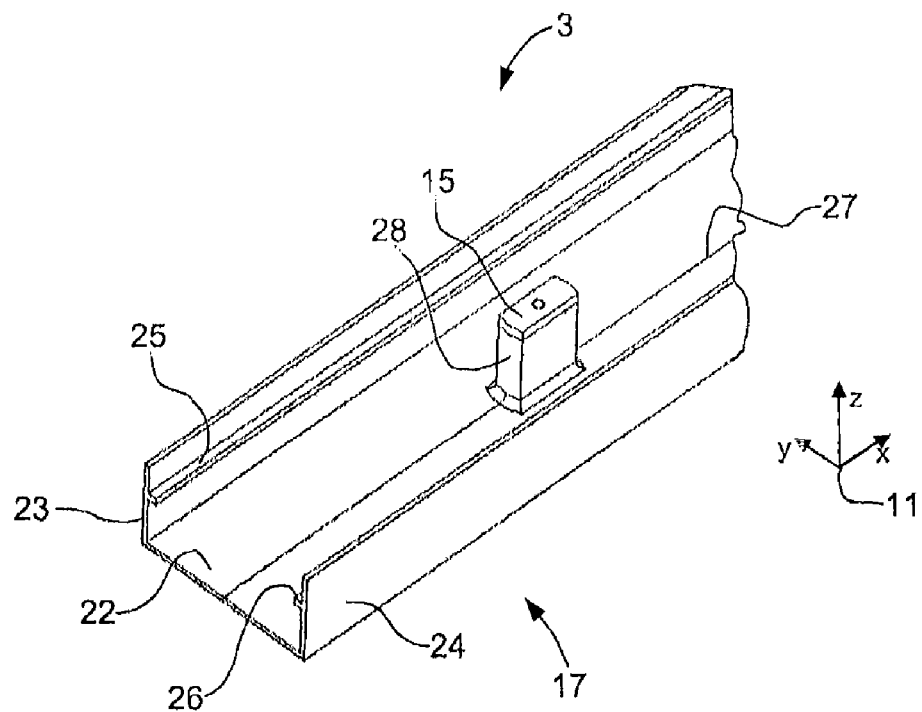
FIG. 3 shows an isometric representation of a starting area of a substructure of the loading device.

FIG. 3 shows an isometric representation of a starting area of a substructure of a loading device. For illustration of the positions of the x-, the y-, and the z-axes in space, the coordinate system 11 is shown.

The substructure 3 is formed substantially as a U-shaped profile with a base 22 and two webs 23, 24. The substructure 3 has two bearing surfaces 25, 26 oriented inwardly, preferably extending over the entire length of the substructure 3. Alternatively, also an only partial arrangement of the bearing surfaces 25, 26 on the webs 23, 24 is possible. The bearing surfaces 25, 26 serve as bearings for the roller conveyer 2 in the substructure 3. Based on the continuous design of the bearing surfaces 25, 26, in particular, an effective conductance of the downwardly directed pressure forces originating from the roller conveyer 3 with high loads onto the substructure 3 counter to the direction of the z-axis is provided. The webs 23, 24 therefore define a movement of the inserted roller conveyer 2 parallel to the z-axis.

In the starting area 17 of the substructure 3, in the region of a center line 27, a first support 28 as a holding device is arranged. The locking bar 15 is pivotably accommodated on the support 28. A second support that is not visible in FIG. 3 with the locking bar 16 pivotably disposed thereon is located in the end area 18 (not shown) of the substructure 3. The end area 18 of the substructure 3 corresponds with or is symmetrical to the starting area 17 (see, for example, FIG. 2). The support 28 as well as the support (not shown) in the end area 18 absorb in particular forces originating from the roller conveyor 2 parallel to the x-axis. The locking bar 15 is shown in FIG. 3 in the straight, that is, unlocked position, in which the roller conveyer 2 can be placed in the substructure 3. In the unlocked state, the locking bar 15 is oriented parallel to the x-axis. In the locked state, the locking bar 15 is disposed in a position that is pivoted at about 90° relative to the position shown in FIG. 3, in order to prevent lifting up of the roller conveyor 2 from the substructure 3 in the direction of the z-axis.

In an alternative embodiment, it is possible to form a larger number of supports or only one support in the region of the base 22 of the substructure 3. In a further embodiment, an asymmetric arrangement of the supports relative to the center line 27 is contemplated. The supports can be hollow, or have a tapering cross-section or the like for weight-savings considerations. In addition, the supports can have a geometric design that deviates from the right-angle shape that is shown. The entire substructure 3 as well as the support structure of the roller conveyor 2 can be made with aluminum or with an aluminum alloy in an extrusion process. The supports alternatively can be formed as a continuous rod arranged along the center line 27, which has sufficiently large recesses only in the area of the transport rollers 5, 6, 7, 8, 9, 10. In addition, it is also contemplated to make the supports not as one piece with the substructure, but as separate components, which are connected in the area of the base 22 with the substructure 3, for example, by riveting, cementing, welding or the like.

Figure 4:
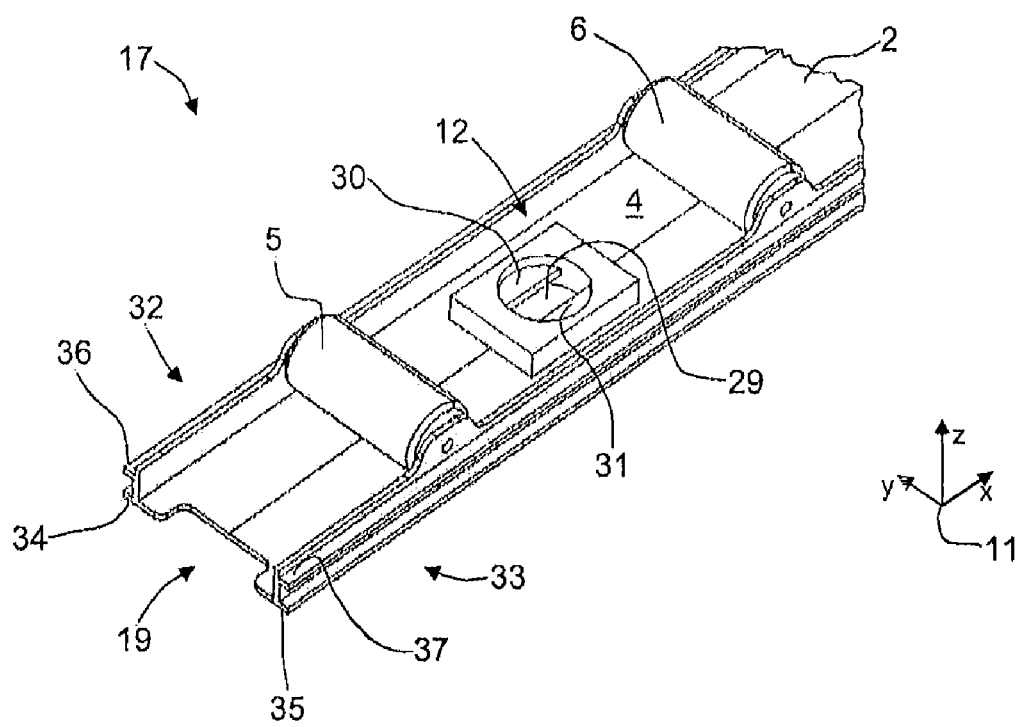
FIG. 4 shows an isometric representation of the starting area of a roller conveyor of the loading device.

FIG. 4 shows the isometric representation of the starting area of a roller conveyor of the loading device. For illustrating the position of the x-, the y-, as well as the z-axes in space, again the coordinate system 11 is shown.

In FIG. 4, the first two transport rollers 5, 6 are shown in the starting area 17 on the top side 4 of the roller conveyor 2. The end area 18 of the roller conveyor 2 is not shown, as indicated with the break line. The end area 18 of the roller conveyor 2, however, is formed symmetrical to the starting area 17 (see FIG. 1, for example). The recess 19 is located on the front side of the roller conveyor 2. A corresponding, mirror-inverted recess is located in the end area 18 of the roller conveyor 2. In addition, the locking means 12 is shown between the two transport rollers 5, 6. The locking means 12 has a substantially rectangular shaped recess 29, into which the first support 28 with the locking bar 15 is insertable in a positive fit manner in the opened position at least partially. In this manner, a very effective conductance of the forces originating from the roller conveyor 2 parallel to the x-axis of the coordinate system 11 is provided on the substructure 3 and also onto the base surface 14. The recess 29 as well as the support 28 can have a cross-sectional geometry that deviates from this.

The locking means 12 has the locking surfaces 30 and 31, which serve for latching the roller conveyor 2 into the substructure 3 in the first position. The locking bar 15 contacts the locking surfaces 30, 31 at least with partial surfaces in the locked position.

In addition, in the region of the longitudinal sides 32, 33, preferably continuous contact surfaces 34 through 37 are arranged. In an alternative embodiment, the contact surfaces 34 through 37 can also be formed only sectionally on the longitudinal sides 32, 33. In the one position of the loading device 1, the contact surfaces 34 and 35 cooperate with the bearing surfaces 25, 26 of the substructure 3; that is, they bear on these, respectively, while in the rotated, position, the contact surfaces 36, 37 cooperate with the bearing surfaces 25, 26 of the substructure 3, that is, they bear on these, respectively.

Figure 5:
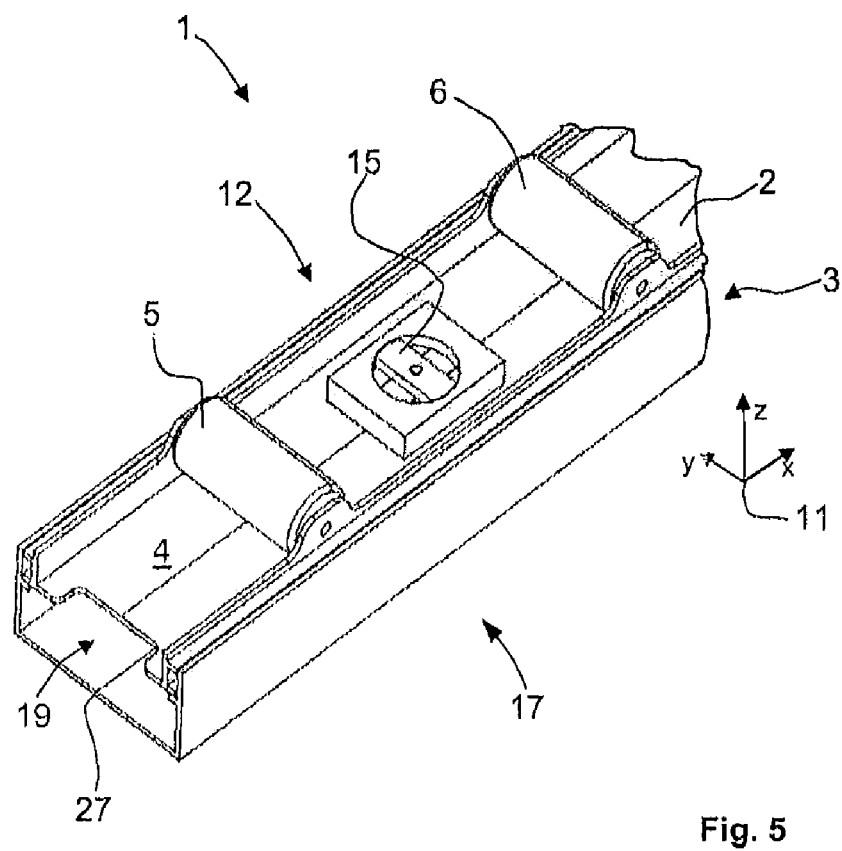
FIG. 5 shows an isometric representation of the starting area of the loading device in the first position.

FIG. 5 shows an isometric representation of the starting area of the loading device in the first position. For illustration of the position of the x-, the y-, as well as the z-axes in space, again the coordinate system 11 is shown.

The roller conveyor 2 is inserted into the substructure 3 for forming the loading device 1. In FIG. 5, only the starting area 17 of the loading device 1 is shown, as indicated by the break line. The recess 19 is disposed in the front side preferably symmetrically to the center line 27. The transport rollers 5, 6, in the region of the top side 4 face upwardly in the direction of the z-axis, in order to facilitate the loading of the cargo space with cargo units with standardized dimensions, for example, with containers or palettes. The locking bar 15 of the locking means 12 are located in a transverse position, that is, in the locked position, so that the roller conveyor 2 is accommodated in the substructure and connected to it.

Figure 6:
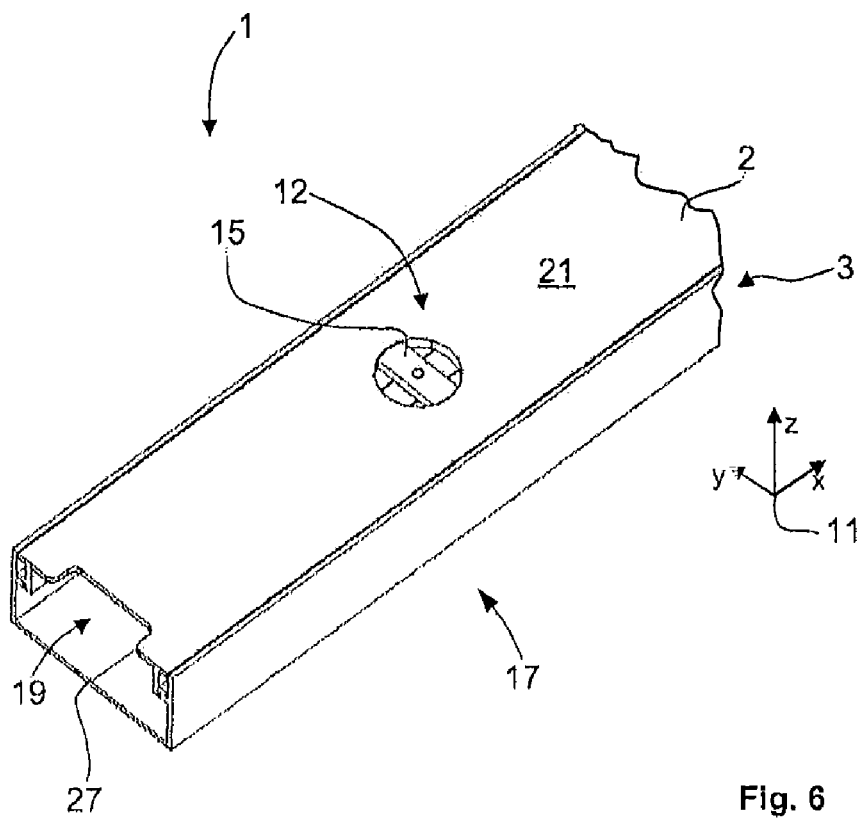
FIG. 6 shows an isometric representation of the starting area of the loading device in the second position.

FIG. 6 shows an isometric representation of the starting area of the loading device in the second position. For illustrating the position of the x-, the y-, as well as the z-axes in space, the coordinate system 11 is shown.

The roller conveyor 2 is accommodated in the second position inverted in the substructure 3, so that now the underside 21 of the roller conveyor 2 faces upwardly in the direction of the z-axis. The locking bar 15 of the locking means 12 is located in a transverse position, that is, in the locked position, so that the roller conveyor 2 is connected with the substructure 3. The top side 4 of the roller conveyor 2 forms a preferably flat, continuous surface with the base surface 14 of the cargo space (not shown in FIG. 6), which is suited in particular for driving with motor vehicles.

Figure 7:
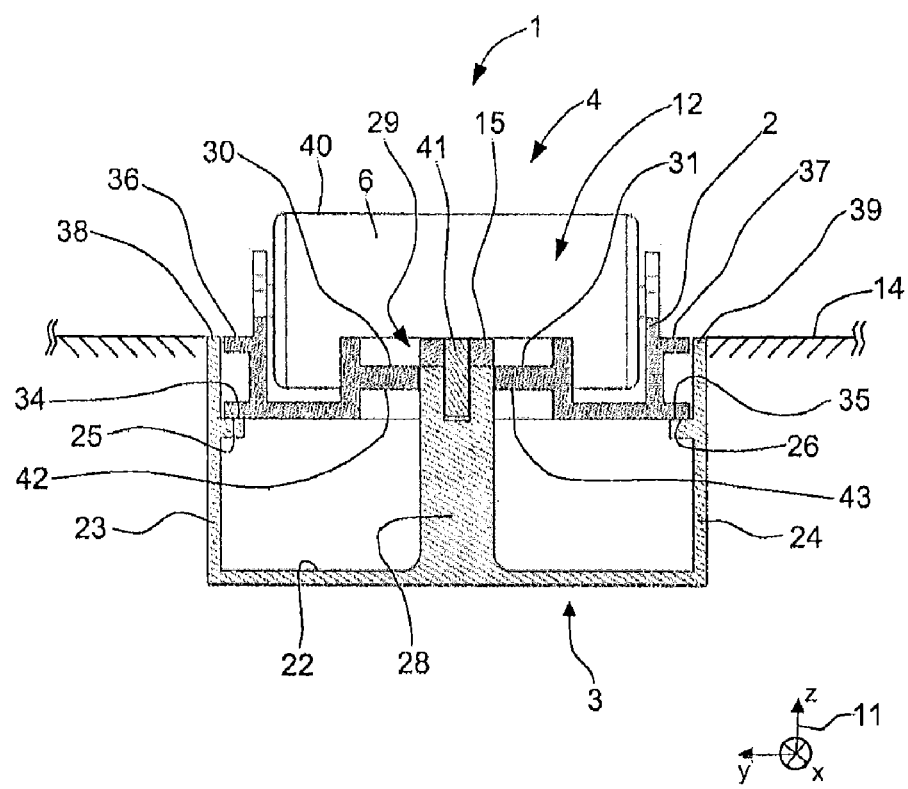
FIG. 7 shows a sectional view through the loading device in the first position in an unlocked state along the line of intersection A-A in FIG. 1.

FIG. 7 shows a sectional view through the loading device in the first position in the unlocked state along the line of intersection A-A of FIG. 1 in the starting area 17. For illustrating the position of the x-, the y-, and the z-axes, the coordinate system 11 is shown.

The roller conveyor 2 is accommodated in the substructure 3 for forming the loading device 1. In the first position shown ("roller conveyor mode"), the loading device 1 serves in particular for loading cargo units with standardized dimensions, in particular, palettes or containers, into a cargo space.

The contact surface 34 of the roller conveyor 2 bears on the bearing surface 25 of the substructure 3 or cooperates with it. The top side 4 of the roller conveyor 2 faces upwardly, in the direction of the z-axis. The substructure 3 is formed in the shape of a U-profile and is made up of the webs 23, 24 as well as the base 22. Accordingly, the contact surface 35 of the roller conveyor 2 bears on the bearing surface 26 of the substructure 3 or cooperates with it. By means of this preferably edge-sided, continuous support of the roller conveyor 2 in the substructure 3 in the area of the bearing surfaces 25, 26, an effective conductance of the downwardly directed forces from the roller conveyor 2 counter to the direction of the z-axis onto the substructure 3 and onto the base surface 14 is provided. In addition, two upper edges 38, 39 of the substructure 3 preferably bear almost flush against the base surface 14. Accordingly, also the contact surfaces 36, 37 of the roller conveyor 2 bear almost flush on the base surface 14. A crown line 40 of the transport roller 6 projects out over the base surface 14, so that cargo units can be conveyed away by means of the rotatably supported transport rollers 5, 6, 7, 8, 9, and 10 by rolling over the base surface 14.

The support 28 is at least partially positively accommodated in an upper region in the recess 29 of the first locking means 12. The support 28 is disposed in the area of the base 22 of the substructure 3. The locking bar 15 is accommodated pivotably by means of a bolt 41 in an end area of the support 28. Two locking surfaces 42, 43 have no function in the first position of the roller conveyor 2 and face downwardly, counter to the direction of the z-axis. In FIG. 7, the locking bar 15 is located in the straight position, oriented parallel to the x-axis, that is, in the unlocked position, so that the roller conveyor 2 can be inserted easily by the user into the substructure 3 or can be lifted again from it.

In the locked state, the locking bar 15 is located in a position that is pivoted at 90 relative to the position shown. In the locked state, the locking bar 15 is oriented essentially parallel to the y-axis. In the locked state, the locking bar 15 lies at least partially on the locking surfaces 30, 31, so that a movement of the roller conveyor 2 in the direction of the z-axis is prevented.

A further locking means is structured to correspond to the previously described locking means 12 and has the same functionality with regard to the locking mechanism (see FIGS. 1, 2). Mechanical forces, which originate from the roller conveyor 2 parallel to the y-axis, are absorbed in particular by the webs 23, 24 of the substructure 3, while forces acting parallel to the x-axis substantially are absorbed by the support 28 as well as by the second support with locking bar displaced to the back (not shown in FIG. 7). In contrast, the mechanical forces acting on the roller conveyor 2 in the direction of the z-axis are primarily absorbed by the locking bar 15 and conducted into the support 28. Mechanical forces which act against the direction of the z-axis, in particular, pressing forces resulting from loading the roller conveyor 2 with cargo units, motor vehicles or the like, are conducted by the contact surfaces 34, 35 preferably over the entire length of the substructure 3 into the bearing surfaces 25, 26. A movement of the locked roller conveyor 2 upwardly or its lifting from the substructure 3 therefore is impossible.

Figure 8:
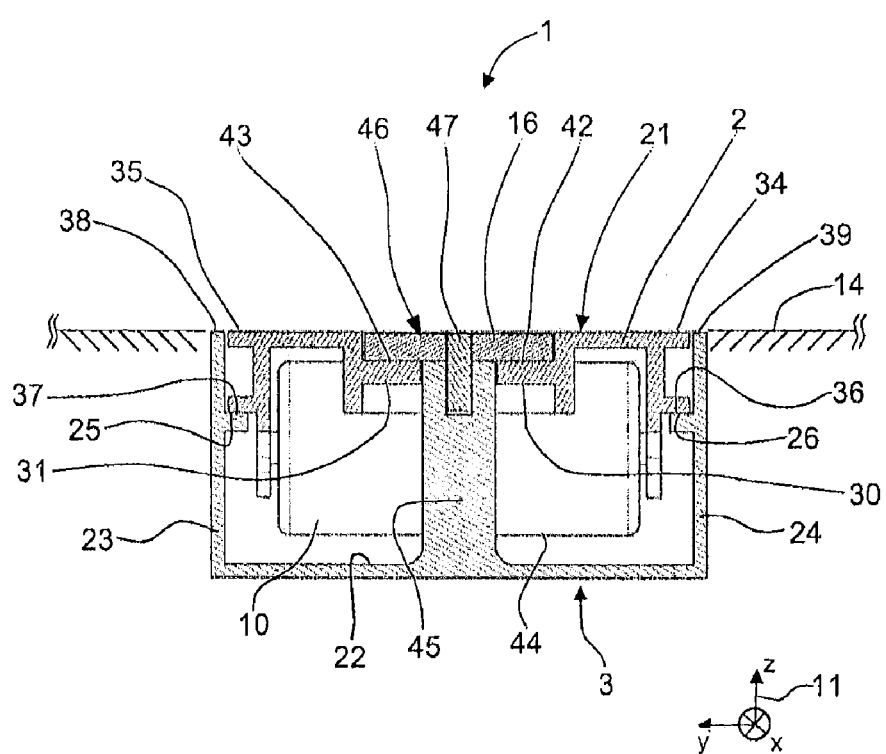
FIG. 8 shows a sectional view through the loading device in the second position in the locked state along the line of intersection B-B in FIG. 2.

FIG. 8 shows a sectional view through the loading device in the second position in the locked state along the line of intersection B-B of FIG. 2 in the end area 18. For illustrating the position of the x-, y-, as well as the z-axes in space, the coordinate system 11 is shown.

The roller conveyor 2 in FIG. 8 is accommodated with its upwardly facing, essentially substantially smooth underside 21 in the substructure 3. The substructure 3 in the form of a U-profile is formed by the webs 23, 24 and the base 22. The roller conveyor 2 is inserted into the substructure 3 in FIG. 8 in relation to the first position shown in FIG. 7 on its longitudinal axis, that is, rotated parallel to the x-axis at 180° ("inverted"). In this second position ("flat mode") of the loading device 1, the underside 21 forms with the base surface 14 of the cargo space substantially a continuous loading surface, so that, in particular motor vehicles can be driven without a problem into the cargo space of an aircraft. A crown line 44 of the transport roller 10 runs with a sufficient distance to the base 22 of the substructure 3, so that the transport roller 10 is accommodated completely in the substructure 3. The same is true for the remaining transport rollers 5, 6, 7, 8, 9, not shown in FIG. 8.

In contrast to the first position of the loading device 1, according to the description of FIG. 7, now the contact surfaces 36, 37 in the second position bear on the bearing surfaces 25, 26 as a result of inverting the roller conveyor 2. The contact surfaces 34, 35 of the roller conveyor 2 lie above opposite thereto and form together with the upper edges 38, 39 of the substructure 3 as well as with the base surface 14 substantially continuous plane that can be driven over by motor vehicles into the cargo space of the aircraft.

An upper area of a second support 45 is accommodated in a form-fitting manner in a recess 46 at least partially. The locking bar 16 of the attachment means 13 is received pivotably by means of a bolt 47 in the end region of the support 45. In FIG. 8, the locking bar 16 is located in the transverse position running parallel to the y-axis, that is, the locked position. In this position, the locking bar bears at least partially on the locking surfaces 42, 43. The locking surfaces 31, 30 face downwardly in the second position of the roller conveyor 2, counter to the direction of the z-axis, and do not have a direct locking function in this position. If the locking bar 16 is pivoted at about 90° and is located then in the straight position, which corresponds to that shown in FIG. 7, the roller conveyor 2 can be lifted out from the substructure 3 in the direction of the z-axis, upwardly from the substructure 3.

In the cargo space of an aircraft, a number of loading devices are positioned in a row and/or next to one another with sufficient space for loading with cargo units in order to make possible easy and quick loading of the entire cargo space with the cargo units.

In an alternative embodiment that is not shown in the drawings, more than two supports 28, 45 are provided between the starting area 17 and the end area 18 of the substructure 3 of the loading device 1. In this case, the supports preferably are distributed to be uniformly spaced from one another over the length of the loading device 1 along the center line 27.

In a further alternative embodiment, it is possible to form the supports as an substantially continuous bar, which has only sufficiently large recesses in the area of the transports rollers 5, 6, 7, 8, 9, 10, in order to make possible the insertion of the roller conveyor 2 into the inverted position in the substructure 3 in the second position.

In conclusion, the design of the loading device of the makes possible a simple conversion from the first into the second position, that is, from a "roller conveyor" mode to the so-called "flat mode." In addition, the loading device makes possible an effective conducting of the forces absorbed by it into the base surface of a cargo space of an aircraft with a reduced weight, compared to known solutions. By the appropriate integration of a plurality of loading devices into the base surface of a cargo space of an aircraft, an easy and quick loading capability of the cargo space with cargo units and/or motor vehicles may be provided. Alternative combinations and variations of the examples provided will become apparent based on this disclosure. It is not possible to provide specific examples for all of the many possible combinations and variations of the examples described.

| REFERENCE NUMERAL TABLE |
| --- |
| 1 loading device |
| 2 roller conveyor |
| 3 substructure |
| 4 top side |
| 5 transport roller |
| 6 transport roller |
| 7 transport roller |
| 8 transport roller |
| 9 transport roller |
| 10 transport roller |
| 11 coordinate system |
| 12 locking means |
| 13 locking means |
| 14 base surface |
| 15 lock bar |
| 16 lock bar |
| 17 starting area |
| 18 end area |
| 19 recess |
| 20 recess |
| 21 underside |
| 22 base |
| 23 web |
| 24 web |
| 25 bearing surface |

-continued

REFERENCE NUMERAL TABLE 26 bearing surface
27 center line
28 support
29 locking surface
31 locking surface
32 longitudinal side
33 longitudinal side
34 contact surface
35 contact surface
36 contact surface
37 contact surface
38 upper edge
39 upper edge
40 crown line
41 bolt
42 locking surface
43 locking surface
44 crown line
45 support
46 recess
47 bolt

The invention claimed is:

1. A loading device for cargo spaces in transportation comprising: a roller conveyor, a substructure, and pivotable locking bars capable of connecting the roller conveyor to the substructure, wherein the roller conveyor has contact surfaces and bears into a first position on the substructure for placing cargo units into a cargo space, and a second position for placing vehicles into the cargo space, the roller conveyor is capable of being placed into the substructure for forming a substantially flat base surface of the cargo space in the second position, the substructure is formed as a U-profile, the U-profile having a base and two webs, the webs having bearing surfaces oriented at least partially inwardly and the contact surfaces are formed such that the contact surfaces cooperate with the bearing surfaces in the first position and the second position, and the pivotable locking bars are insertable into a locking position in corresponding recesses and which contact locking surfaces in a locking position.

2. The loading device of claim 1, wherein a holding device is disposed in a region of the base of the U-profile.

3. The loading device of claim 1, wherein a holding device has at least two supports, which are insertable into corresponding recesses in the roller conveyor.

4. The loading device of 3, wherein the at least two supports are arranged, such that transport rollers of the roller conveyor are located in the second position between the at least two supports.

5. The loading device of 3, wherein the at least two supports are disposed in a region of a center line of the base.

6. The loading device of claim 3, wherein the at least two supports each have a pivotable locking bar for releasable locking of the roller conveyor onto the substructure.

7. The loading device of claim 1, wherein the contact surfaces are disposed at least partially on opposite longitudinal sides of the roller conveyor.

8. The loading device of 1, wherein the substructure as well as the roller conveyor are formed at least partially with aluminum or an aluminum alloy.

9. The loading device of claim 1, wherein transport rollers are accommodated rotatably on the roller conveyor in bearings.

10. The loading device of 1, wherein transport rollers are distributed to be uniformly spaced over a length of the roller conveyor.

11. A loading device, for cargo spaces in transportation, comprising: a roller conveyor, a substructure, and a locking device capable of connecting the roller conveyor to the substructure, wherein the roller conveyor has contact surfaces and bears into a first position on the substructure for placing cargo units into a cargo space, and a second position for placing vehicles into the cargo space, the roller conveyor is capable of being placed into the substructure for forming a substantially flat base surface of the cargo space in the second position, the substructure is formed as a U-profile, the U-profile having a base and two webs, the webs having bearing surfaces oriented at least partially inwardly and the contact surfaces are formed such that the contact surfaces cooperate with the bearing surfaces in the first position and the second position, the locking device bears in the second position approximately flush with an underside of the roller conveyor, in order to form the substantially flat base surface of the cargo space.

12. The loading device of 11, wherein transport rollers are distributed to be uniformly spaced over a length of the roller conveyor.

13. The loading device of claim 11, wherein a holding device is disposed in a region of a base of the U-profile.

14. The loading device of claim 11, further comprising a holding device, wherein the holding device has at least two supports, which are insertable into corresponding recesses in the roller conveyor.

15. The loading device of 14, wherein the at least two supports are arranged, such that transport rollers of the roller conveyor are located in the second position between the at least two supports.

16. The loading device of 14, wherein the at least two supports are disposed in a region of a center line of the base.

17. The loading device of claim 14, wherein the at least two supports each have a locking device for releasable locking of the roller conveyor onto the substructure.

18. The loading device of 11, wherein the contact surfaces are disposed at least partially on opposite longitudinal sides of the roller conveyor.

19. The loading device of 11, wherein the substructure as well as the roller conveyor are formed at least partially with aluminum or an aluminum alloy.

20. The loading device of claim 11, wherein transport rollers are accommodated rotatably on the roller conveyor in bearings.

* * * * *